(12) United States Patent
Garrioch

(10) Patent No.: US 8,876,089 B2
(45) Date of Patent: Nov. 4, 2014

(54) METHOD AND APPARATUS TO KEEP AN AERATOR FULL OF AIR

(75) Inventor: Stephen Hugh Garrioch, Oakville (CA)

(73) Assignee: Zenon Technology Partnership, Wilmington, DE (US)

( * ) Notice: Subject to any disclaimer, the term of this patent is extended or adjusted under 35 U.S.C. 154(b) by 644 days.

(21) Appl. No.: 13/233,741

(22) Filed: Sep. 15, 2011

(65) Prior Publication Data

US 2013/0069256 A1    Mar. 21, 2013

(51) Int. Cl.
| B01F 3/04 | (2006.01) |
| B01D 65/08 | (2006.01) |
| C02F 1/74 | (2006.01) |
| C02F 1/44 | (2006.01) |

(52) U.S. Cl.
CPC ....... *B01D 65/08* (2013.01); *B01F 2003/04432* (2013.01); *C02F 1/74* (2013.01); *B01D 2315/06* (2013.01); *B01F 3/04241* (2013.01); *C02F 1/444* (2013.01); *B01D 2321/185* (2013.01)
USPC ........................................ 261/122.1; 261/123

(58) Field of Classification Search
CPC ................. B01F 3/04241; B01F 2003/04432; B01D 65/08; B01D 2315/06; B01D 2321/185; C02F 1/444; C02F 1/74
USPC ........................................ 261/122.1, 123, 124
See application file for complete search history.

(56) References Cited

U.S. PATENT DOCUMENTS

| 1,541,853 | A | * | 6/1925 | Rottmann | ................... | 261/121.1 |
| 1,574,783 | A | | 6/1925 | Beth | | |
| 2,608,399 | A | * | 8/1952 | Alcock | ....................... | 261/122.1 |

(Continued)

FOREIGN PATENT DOCUMENTS

| CN | 1931419 | 9/2005 |
| EP | 0937494 | 8/1999 |

(Continued)

OTHER PUBLICATIONS

Shinko Pfaudler Co Ltd, English Abstract of JP 01111494 published Apr. 28, 1989.

(Continued)

*Primary Examiner* — Charles Bushey
(74) *Attorney, Agent, or Firm* — Scott Pundsack; Borden Ladner Gervais LLP

(57) ABSTRACT

An aeration system has aerators that remain generally full of air when the supply of pressurized air is turned off or vented. Water does not reach the bubble discharging holes of the aerator, which are kept from plugging. The aerator has a body with a hole through a wall of the body to discharge bubbles. The hole is surrounded by a skirt at the wall of the body. The skirt extends to below the elevation of the hole. The aerator body is connected to a source of pressurized gas through an open bottomed chamber. An opening between the aerator body and the inside of the chamber is located below the elevation of the hole. When the supply of gas is off, water enters the chamber and possibly the skirt. However, the water can only rise until it has reached the skirt and the opening, both of which are below the hole, and the entire aerator body is kept dry. Aerator fouling is reduced, and the aerator begins to produce an even flow of bubbles quickly when the supply of gas returns.

16 Claims, 3 Drawing Sheets

(56) References Cited

U.S. PATENT DOCUMENTS

| | | |
|---|---|---|
| 3,068,655 A | 12/1962 | Murray et al. |
| 3,246,761 A | 4/1966 | Bryan |
| 3,592,450 A | 7/1971 | Rippon |
| 3,628,775 A | 12/1971 | McConnell |
| 3,847,508 A | 11/1974 | Mowen |
| 3,898,018 A | 8/1975 | Weis |
| 4,005,014 A * | 1/1977 | Wikey .................. 210/192 |
| 4,169,873 A | 10/1979 | Lipert |
| 4,187,263 A | 2/1980 | Lipert |
| 4,356,131 A | 10/1982 | Lipert |
| 4,439,316 A | 3/1984 | Kozima et al. |
| 4,478,211 A | 10/1984 | Haines et al. |
| 4,569,804 A | 2/1986 | Murphy |
| 4,752,421 A | 6/1988 | Makino |
| 4,789,503 A | 12/1988 | Murphy |
| 4,828,696 A | 5/1989 | Makino et al. |
| 4,863,644 A | 9/1989 | Harrington et al. |
| 4,906,363 A | 3/1990 | Makino et al. |
| 4,911,838 A | 3/1990 | Tanaka |
| 4,923,614 A | 5/1990 | Engelbart |
| 5,169,781 A | 12/1992 | Nojima et al. |
| 5,605,653 A | 2/1997 | DeVos |
| 5,620,891 A | 4/1997 | Drummond et al. |
| 5,783,118 A * | 7/1998 | Kolaini .................. 261/37 |
| 5,944,997 A | 8/1999 | Pedersen et al. |
| 6,162,020 A | 12/2000 | Kondo |
| 6,245,239 B1 | 6/2001 | Cote et al. |
| 6,863,823 B2 | 3/2005 | Cote |
| 7,017,557 B2 | 3/2006 | Rumpf |
| 7,168,691 B2 | 1/2007 | MacLaren |
| 7,294,255 B2 | 11/2007 | Kondo |
| 7,381,326 B2 | 6/2008 | Haddas |
| 7,874,548 B1 * | 1/2011 | McGuffin .................. 261/120 |
| 7,879,229 B2 | 2/2011 | Phagoo et al. |
| 7,938,966 B2 | 5/2011 | Johnson |
| 2005/0006308 A1 | 1/2005 | Cote et al. |
| 2007/0166171 A1 | 7/2007 | Kondo |
| 2009/0194477 A1 | 8/2009 | Hashimoto |
| 2009/0255872 A1 | 10/2009 | Busnot et al. |
| 2010/0300968 A1 | 12/2010 | Liu et al. |

FOREIGN PATENT DOCUMENTS

| | | |
|---|---|---|
| EP | 1119522 | 4/2004 |
| EP | 1652572 | 5/2006 |
| EP | 1897857 | 3/2008 |
| GB | 996195 | 6/1965 |
| JP | 01104396 | 4/1989 |
| JP | 01111494 | 4/1989 |
| JP | 04265128 | 9/1992 |
| JP | 07-185270 | 7/1995 |
| JP | 07185271 | 7/1995 |
| JP | 7241591 A | 9/1995 |
| JP | 08141566 | 4/1996 |
| JP | 08312161 | 11/1996 |
| JP | 09-038470 | 2/1997 |
| JP | 9201597 A | 8/1997 |
| JP | 09220569 | 8/1997 |
| JP | 10066834 A | 3/1998 |
| JP | 2004322100 | 11/2004 |
| JP | 2006081979 | 3/2006 |
| WO | 9706880 | 2/1997 |
| WO | 9828066 | 7/1998 |
| WO | 0021890 | 4/2000 |
| WO | 2004050221 | 6/2004 |
| WO | 2004056458 | 7/2004 |
| WO | 2005105275 | 11/2005 |
| WO | 2006029465 | 3/2006 |

OTHER PUBLICATIONS

Shinko Pfaudler Co Ltd, English Abstract of JP 01104396 published Apr. 21, 1989.
International Search Report and Written Opinion issued in connection with PCT/US2010/043926, Oct. 21, 2010.
Kurita Water Ind Ltd, English Abstract of JP 07185270 published Jul. 25, 1995.
Kurita Water Ind Ltd, English Abstract of JP 2004322100 published Nov. 18, 2004.
Kurita Water Ind Ltd, English Abstract of JP 07185271 published Jul. 25, 1995.
Hitachi Ltd, English Abstract of JP09-038470, published Feb. 10, 1997.
China Petrochemical Corp., English Abstract of CN1931419 published Sep. 16, 2005.
Mini-Ject Above-Grade Ejector Lift Station, from http://smithandloveless.com/cgi-local/H2O/H2O.cgi?db+pumps&..., printed Jan. 28, 2009.
Kubota Corp, English Abstract of JP 09220569 published Dec. 25, 1997.
Aintetsuku:KK, English Abstract of JP 08312161 published Nov. 26, 1996.
Kubota Corp, English Abstract of JP 08141566 published Jun. 4, 1996.
Asahi Kasei Chemicals, English Abstract of JP2006081979 published Mar. 30, 2006.
Ashbrook Simon-Hartley, Diffused Aeration, 2011. http://www.ashbrookcorp.com/us/en-us/diffusedaeration.aspx.
Red Valve Company, Inc., Coarse and Fine Bubble Air Diffuser Systems, 2000. http://mxprom-file.s3.amazonaws.com/40__difusoresproagua.pdf.
Red Valve Company, Inc., Novel Check Valves in Aeration Basin Cut Energy, Maintenance Costs, Water Online, Jul. 7, 1999. http://www.wateronline.com/doc.mvc/Novel-Check-Valves-in-Aeration-Basin-Cut-Ener-0002.
ITT, Aeration Products for Energy-Efficient Biological Treatment, http://www.flygt.fi/3374733.pdf, 2012.
Search Report and Written Opinion from corresponding PCT Application No. PCT/US2012/050509 dated Feb. 26, 2013.

* cited by examiner

METHOD AND APPARATUS TO KEEP AN AERATOR FULL OF AIR

FIELD

This specification relates to devices and methods for introducing bubbles into a liquid, for example a system including an aerator, diffuser or sparger, and to aerated immersed membrane systems for treating water or wastewater.

BACKGROUND

The following discussion is not an admission that anything described below is common general knowledge or citable as prior art.

Aerators are used in immersed membrane systems, for example, to produce bubbles in water below a membrane module. The aerator may be in the form of a tube or other hollow body connected to a source of pressurized air, or another gas, and having holes to release the air as bubbles from the aerator body. The bubbles rise through the module, scouring the membranes to inhibit fouling. However, particularly when the module is immersed in mixed liquor or other types of wastewater, the aerator itself can become fouled. For example, during periods of time when the air supply is shut off for maintenance or other reasons, water may enter the aerator. When the air is turned back on, the water is blown out but some solids may stick to the surfaces of the aerator or be mechanically trapped in the aerator. These solids dry out and harden, and may attract or trap additional solids the next time the aerator is flooded. Eventually, the solids may accumulate to the point where they partially or completely block one or more of the holes. When this happens the aerator does not deliver a full flow of bubbles, and this allows the membrane modules to foul more rapidly.

U.S. Pat. No. 5,944,997 describes a method of cleaning fouled aerators in a membrane bioreactor. The aerators are flushed with a burst of liquid permeate, or with a burst of liquid permeate with entrained air bubbles. U.S. Pat. No. 6,245,239 describes a cyclic aeration system for submerged membrane modules. In this system, the air supply to an aerator is turned on and off frequently, for example every 20 seconds. While the air supply is off, an air supply pipe may be vented to intentionally flood the aerator. In this way, the solids are kept from drying out to reduce their tendency to plug the aerator. However, the venting requires additional valve operations, solids may still accumulate at the flooded water level, and solids such as fibers that are mechanically trapped can still accumulate in the aerator.

INTRODUCTION TO THE INVENTION

An aeration system described in detail further below is designed such that the aerators remain generally full of air even when the air supply is turned off, or even vented. A pocket of air is retained in the aerator to below the depth of holes in the aerator. Since water does not enter the aerator, or at least does not reach the holes, the aerator is kept from plugging. In addition, the aerator can begin to produce an even flow of bubbles almost immediately after the air supply is turned on.

The aerator has a body, such as a tube, with a hole through a wall of the body. The hole is surrounded by a skirt at the wall of the body. The skirt extends to below the elevation of the hole. The aerator body is connected to a source of a pressurized gas through an open bottomed chamber. An opening between the aerator body and the inside of the chamber is located below the elevation of the hole. When the supply of pressurized gas is turned off, water enters the chamber and possibly the skirt. However, the water can only rise until it has reached the skirt and the opening, both of which are below the hole. The holes and all other parts of the aerator above the skirt and the opening, whichever is higher, are kept dry. Preferably, the hole is at or near the bottom of the aerator and the entire aerator body is kept dry.

Keeping the aerator body full of air, whether the supply of gas is on or off, prevents or at least inhibits fouling of the holes. In addition, any water that has entered the aeration system upstream of the chamber when the gas supply is off may be purged through the chamber, rather than the aerator, when the gas supply is back on. A start up phase in which water must be purged from the aerator is eliminated.

BRIEF DESCRIPTION OF FIGURES

FIG. 1 is a cross sectional elevation view of part of an aeration system, including an aerator and a chamber, immersed in an open tank of water with the supply of air turned on.

DETAILED DESCRIPTION

Figure 1:
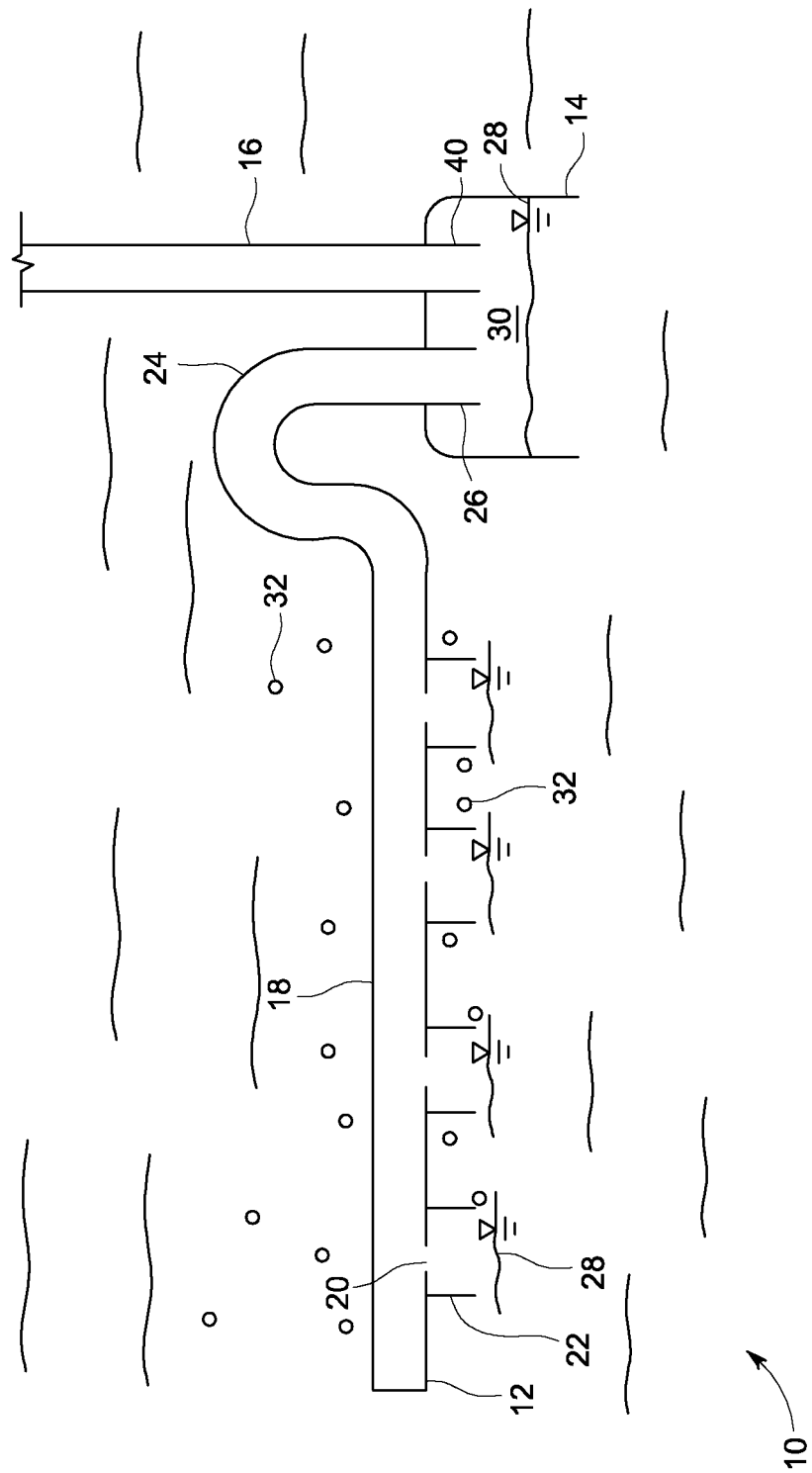
Figure 2:
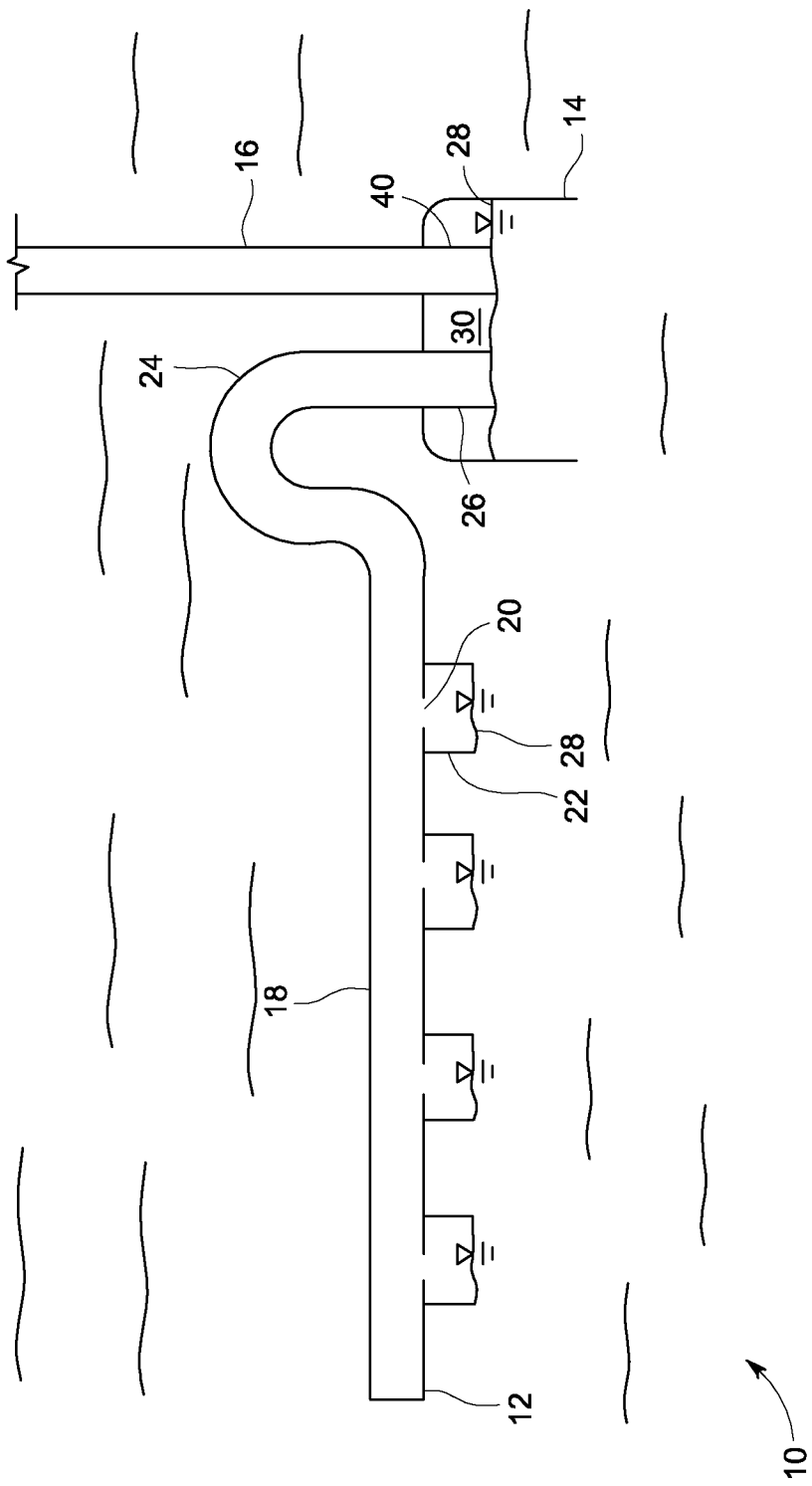
FIG. 2 is a cross sectional elevation view of the part of the aeration system of FIG. 1 with the supply of air turned off.

FIGS. 1 and 2 show parts of an aeration system 10 including an aerator 12, alternatively called a diffuser or sparger, and a chamber 14. The system 10 will be described below as used to supply bubbles of air in water in an open tank being filtered with an immersed membrane module (not shown). The water may be any sort of water, including mixed liquor or another form of raw or partially treated wastewater. The immersed membrane module may be any sort of module, such as hollow fiber module or a flat sheet module. Although the description below refers to air, another gas or mixture of gases such as oxygen, oxygen enriched air, nitrogen, hydrogen, carbon dioxide or biogas, might also be used. Further, the system 10 may also be used in other applications requiring bubbles of a gas in a liquid.

The chamber 14 receives air from an air inlet pipe 16. One end of the air inlet pipe 16 is connected to a source of pressurized air (not shown). The source of pressurized air may be, for example, a compressed gas tank or a blower. The source of pressurized air is typically connected to the air inlet pipe through a series of other pipes, valves, and controllers as is known in the art. The air may be supplied generally continuously, but stopped periodically for maintenance, chemical cleaning of the membrane module, or other reasons. Alternatively, the air may be supplied intermittently, for example during backwashing processes; or in cycles, for example with the air turned on for 10 seconds out of every 20 or 40 seconds. The air supply may be turned on and off, for example, by operating a valve (not shown) connected to the air inlet pipe 16 or by turning a blower on and off. An outlet 40 at the other end of the air inlet pipe 16 discharges air into the chamber 14. The outlet 40 may protrude downwards into the chamber 14 as shown. Alternatively, the air inlet pipe 16 may, for example, enter through the side of the chamber 14 or bubble air into the chamber 14 from below it.

The aerator 12 is also connected to the chamber 14. The aerator 12 has an aerator body 18 with a plurality of holes 20 for discharging air. The aerator body 18 shown in the Figures is a section of a round tube with holes 20 drilled through the bottom of the tube. Optionally, tubes of other shapes may be used, and the holes 20 may be placed in other locations. Further, the aerator body might not be elongated but made instead in the form of a disc or box shaped body. The holes 20 may be arranged, for example, in a rectangular grid, or radially and circumferentially in one or more parts of the aerator body. The size, number and location of the holes 20 is chosen, among other things, to promote an even distribution of air flow between the holes 20. For example, the holes 20 may be made sufficiently small such that the pressure drop of air flowing through each holes 20 encourages an even distribution of air flow between different holes 20.

Each hole 20 is located within a skirt 22. The skirt 22 is connected to the aerator body 12 along a line of connection that surrounds the hole 20. The skirt 22 extends from its connection with the aerator body 12 to an elevation below the hole 20. Air discharged from the hole 20 passes through the skirt 22 before it is emitted from the aerator 12. The skirt 22 has a cross-sectional area that is larger then the hole 20, for example 4 or more times larger, or 9 or more times larger. The skirt 22 shown is a short tubular section. Other shapes may also be used, but the interior of the skirt 22 preferably does not have any crevices, concave shapes, sharp edges or other features of shape that might collect solids. Some water may enter into the bottom of the skirt 22, but the size and shape of the skirt 22 make it much less prone to fouling than the hole 20. Optionally, if a well defined bubble discharge point is desired, the bottom edge of the skirt 22 may have one or more indentations such that bubbles will tend to be formed at the indentations. Optionally, two or more holes 20 may be located within a shared skirt 22.

The aerator 12 is connected to the chamber 14 through a connecting section 24 that extends between the aerator body 18 and an opening 26 to the inside of the chamber 14. The opening 26 is located below the elevation of the holes 20. As will be described further below, water will not be able to rise in the aerator 12 above the elevation of the opening 26 or the elevation of the bottom of the skirt 22, whichever is higher. The holes 20, and preferably the aerator body 18 and connecting section 24, are located above this elevation so that water does not enter them.

In FIG. 1, air is being supplied to the aerator 12. The air pushes the water surface 28 downwards from the top of the chamber 14 to form a pocket 30 of air in the chamber 14. The water surface 28 is below the opening 26 to the aerator 12 and so air flows from the pocket 30 into the aerator 12. The connecting section 24 and aerator body 18 are filled with air, and carry air to the holes 20. Air is discharged from the holes 20 and fills the skirts 22. Bubbles 32 are released from the lower edges of the skirts 22.

In FIG. 2, the supply of air has been turned off. The water surface 28 rises in the chamber 14 until it reaches the opening 26, thus closing off the opening 26 from communication with any remaining pocket 30 of air. Water also rises to cover the lower edges of the skirts 22. Air in the aerator body 18, connecting section 24 and the skirts 22 is now trapped and the water can not rise further. The holes 20 and all other parts of the aerator 12 above the lower edges of the skirts 22 and the opening 26, whichever is higher, are kept dry. As shown, the holes 20 may be at or near the bottom of the aerator 12, and the entire aerator body 18 may be kept dry. A pocket of air is retained in the aerator 12 to below the depth of the holes 20.

Because water does not enter the aerator 12 body 18 through the holes 20, the primary cause of aerator fouling is removed or at least reduced. The skirts 22 preferably also extend far enough below the holes 20 such that splashes of water do not enter through the holes 20 when the air is turned on. Provided that the aerator 12 is kept level, water also does not enter the aerator body 18 through the holes 20 when the aerator 12 is inserted into the water or removed from the water.

When the air is turned back on, the system 10 goes back to the condition shown in FIG. 1. Any water that has entered the air inlet pipe 16 is blown out of the air inlet pipe 16 through the chamber 14. This avoids having to purge water that has entered an aeration system out through the aerator. Purging the inlet pipe 16 through the chamber 14 is easier on the air blowers and faster than purging water through an aerator because the chamber 14 provides almost no resistance to flow beyond the static pressure of the water in the tank itself. Further, the aerator 12 begins to produce bubbles 32 evenly from all holes 20 as soon as the pocket of air 30 reaches the opening 26 of the aerator 12. In comparison, when water must be purged through an aerator, the flow of bubbles is non-uniform and unsteady until all of the water leaves the aerator.

The opening 26 may be at generally the same elevation as the bottom of the skirt 22 such that water does not enter either the opening 26 or the skirt 22 to a significant degree. Alternatively, the bottom of the skirt 22 may be below the opening 26. The aerator 12 will also function with the opening 26 located below the bottom of the skirt 22, but in this case water might enter the connecting section 24 up to the elevation of the bottom of the skirt 22. When the air is turned on, this small amount of water may be blown through the aerator 12, This is not desirable and so it is preferable to have the opening 26 located at or above the bottom of the skirt 22. It is also preferable for the opening 26 to be located at the bottom of the connecting section 24 to further prevent any water from entering the connecting section 24 and being into the aerator 12 when the air supply is turned on.

The connecting section 24 as shown has an inverted U-shaped portion between the aerator body 18 and the opening 26 to the chamber 14. Optionally, the connecting section 24 could simply continue horizontally then turn downwards into the chamber 14 without first bending upwards into the inverted U-shaped section. However, the inverted U-shaped section is useful for accommodating different chamber 14 designs or locations and provides additional protection against water or foam entering the aerator body 18 in case the system 10 is out-of-level or a water surge occurs when the airflow is turned off.

Optionally, the top of the chamber 14 can be made to retain a pocket of air 30 even with the air supply off. This is achieved by having the top of the chamber 14 located above the bottom edge of the skirts 22 and the outlet 40 where the air inlet pipe 16 discharges into the chamber 14, both of which are located below the holes 20. In this case, the top of the chamber 14 functions as part of the connecting section 24. The water surface 28 maintained with the air supply off may be deemed to be the elevation of an opening 26 to the connecting section 24. For example, in aeration system 10 shown in FIG. 2, the lower part of the connecting section 24 that protrudes downwards from the top of the chamber 14 may be partially or completely removed. Although that would at first appear to put the elevation of the opening 26 at or even above the holes 20, since the top of the chamber 14 is maintaining a pocket of air 30, the effective elevation of the opening 26 is at the water surface 28, which is below the holes 20. However, retaining a pocket of air 30 and having the opening 26 protrude downwards into the chamber 14 may help to prevent foam from channeling into the opening 26 when the flow of air is shut off and also provides flexibility in sizing and positioning the chamber 14 relative to the aerator 12.

Optionally, the connecting section 24 may continue downwards beyond the opening 26. Such an extension of the connection section 24 can be used as the chamber 14, and a separate chamber 14 can be deleted. Instead, the air inlet pipe 16 and an extension of the connecting section 24 are connected directly together. To account for the possibility that air inlet pipe 16 might be vented, the air inlet pipe 16 and the connecting section 24 are connected together below the hole 20. At least one of the connecting section 24 and the air inlet pipe 16 is open to water in the tank below the connection and extends downwards from the connection by at least the pressure drop through the aerator 12, measured as a height of water column.

Optionally, a single chamber 14 and air inlet pipe 16 may provide air to two or more aerators 12. For example, the chamber 14 may be an inverted U-shaped channel that extends across one dimension of a cassette having many, for example 10 to 50, membrane modules held in a common frame. Every membrane module, or small group for example of 2 to 4 modules, may has an aerator 12 associated with it. Each of these aerators 12 is connected to the chamber 14 of the cassette. In this way, all of the membrane modules in a cassette can be supplied air from a single air inlet pipe 16. Optionally, a chamber 14 may also provide air to part of a cassette or to multiple cassettes.

When there are multiple aerators 12 connected to a common chamber 14, it is beneficial for the aerators 12 to protrude downwards into the chamber 14 as shown, or for the openings 26 to the aerators 12 to be otherwise located below the top of the chamber 14. The air inlet pipe 16 preferably opens into the chamber from at or below the openings 26 to the aerators 12. With this configuration, a pocket of air 30 is retained in the chamber even when the air supply is off. When the air supply is turned on, the pocket of air 30 provides a low resistance passageway for air to disperse horizontally throughout the chamber to the aerators 12 located farthest from the air inlet pipe 16.

Figure 3:
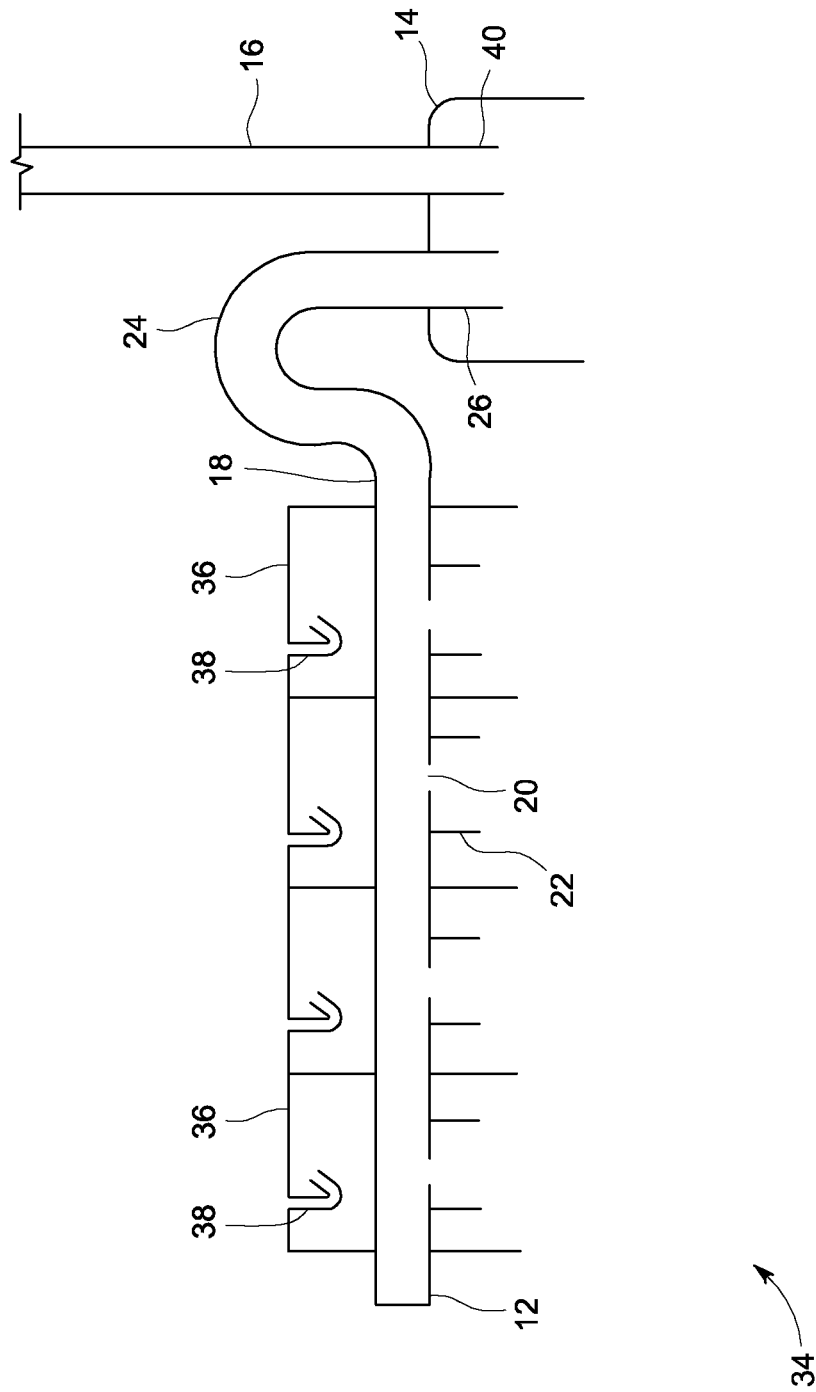
FIG. 3 is a cross sectional elevation view of part of an aeration system including an aerator and a chamber used to supply air to a composite aerator.

In FIG. 3, the aerator 12 is part of a pulsing aerator 34. The pulsing aerator 34 is divided into open bottomed sections 36, each having an inverted J-shaped tube 38 for discharging bubbles. When the supply of air is on, the aerator 12 supplies air continuously to each of the sections 36 of the pulsing aerator 34. Despite the continuous supply of air, the J-shaped tubes 38 release bubbles intermittently when a pocket of air in a section 36 extends to below the bottom of the J-shaped tube 38 in that section 36. The aerator 12 may also be used to supply air to other types of aeration devices having additional components beyond the aerator 12. Optionally, the aerator may also be entirely or partially embodied in a membrane module or cassette. For example, the aerator 12 may be located within a larger skirt extending downwards from the lower potting head of a membrane module having openings in its lower potting head to let the bubbles pass though. Some or all of the aerator 12 might also be formed by moldings or castings that are also used for other purposes in a membrane module or cassette.

I claim:

1. An apparatus for introducing bubbles of a gas into a liquid comprising,
   a) an aerator comprising,
      i) an aerator body;
      ii) a gas discharging hole through the aerator body; and,
      iii) a skirt surrounding the hole at the aerator body and extending downwards from the aerator body to below the hole;
      iv) an opening to receive a flow of a gas;
   b) b) an open-bottomed chamber connected to the opening of the aerator; and,
   c) a gas inlet pipe having an outlet connected to the chamber,
   at least one of the opening of the aerator and the outlet of the gas inlet pipe is located below the hole of the aerator.

2. The apparatus of claim 1 wherein the aerator body is in the form of a tube and the aerator comprises a plurality of holes through the tube at or near the bottom of the tube.

3. The apparatus of claim 2 wherein each of the holes is surrounded by a separate skirt.

4. The apparatus of claim 1 wherein the aerator comprises a connecting section between the aerator body and the opening, and the connecting section has a portion that extends downwards relative to the aerator body to the opening.

5. The apparatus of claim 4 wherein the portion of the connecting section extends downwards into the chamber.

6. The apparatus of claim 4 wherein the connecting section further comprises a second portion that extends upwards from the aerator body.

7. The apparatus of claim 1 wherein a plurality of aerators are connected to a common chamber.

8. The apparatus of claim 7 wherein each of the plurality of aerators has an opening to the chamber located below the top of the chamber.

9. The apparatus of claim 1 wherein an outlet of the air inlet pipe is located at or below the bottom of the skirt.

10. The apparatus of claim 1 wherein the aerator is located in an open tank of water and an immersed membrane module is located above the aerator.

11. The apparatus of claim 1 wherein a plurality of aerators are connected to a common chamber, the aerators and chamber are located in an open tank of water, and a cassette of immersed membranes is located above the aerators.

12. The apparatus of claim 1 wherein the chamber is an extension of either the aerator or the air inlet pipe.

13. The apparatus of claim 1 wherein the open-bottomed chamber extends below the bottom of the skirt.

14. The apparatus of claim 1 wherein the opening to the aerator is located at or above the bottom of the skirt.

15. The apparatus of claim 14 wherein the outlet from the air inlet pipe is located at or below the bottom of the skirt and the open-bottomed chamber extends below the bottom of the skirt.

16. The apparatus of claim 1 wherein the opening to the aerator is located above the bottom of the skirt.

* * * * *